United States Patent [19]

Miller

[11] 4,027,335
[45] May 31, 1977

[54] DC FREE ENCODING FOR DATA TRANSMISSION SYSTEM

[75] Inventor: Jerry Wayne Miller, Menlo Park, Calif.

[73] Assignee: Ampex Corporation, Redwood City, Calif.

[22] Filed: Mar. 19, 1976

[21] Appl. No.: 668,679

[52] U.S. Cl. .................................................. 360/40
[51] Int. Cl.² ......................................... G11B 5/09
[58] Field of Search ........................ 360/40, 45, 51

[56] References Cited
UNITED STATES PATENTS

| | | | |
|---|---|---|---|
| 3,622,894 | 11/1971 | Heidecker et al. | 360/45 |
| 3,810,111 | 5/1974 | Parel | 360/40 |
| 3,838,448 | 9/1974 | Garbe et al. | 360/45 |
| 3,855,616 | 12/1974 | Schneider | 360/40 |

*Primary Examiner*—Vincent P. Canney

[57] ABSTRACT

A method and apparatus provide for the elimination of any net DC component from the transmission of binary data sequentially in successive clocked bit cells of a transmission channel wherein logical first bit states, e.g., 0's are normally transmitted as signal transitions relatively early in respective bit cells, preferably at cell edge, and logical second bit states, e.g., 1's are normally transmitted as signal transitions relatively late in respective bit cells, preferably at mid-cell, and any transition relatively early in a bit cell following a transition relatively late in the next preceding bit cell is suppressed. The onset of a sequence of second bit states following a first bit state that might introduce a DC component into the transmitted signal with normal transmission is detected by producing a first indicating signal, and in response to the first indicating signal and the state of a current bit and the state of the next succeeding bit the transmission of signal transitions is modified to eliminate any DC component. Preferably, the end of a sequence of second bit states that would introduce a DC component is detected by producing a second indicating signal utilized to modify the signal transitions at the end of a troublesome sequence, as by suppressing the transition corresponding to the last second bit state in such a sequence.

14 Claims, 9 Drawing Figures

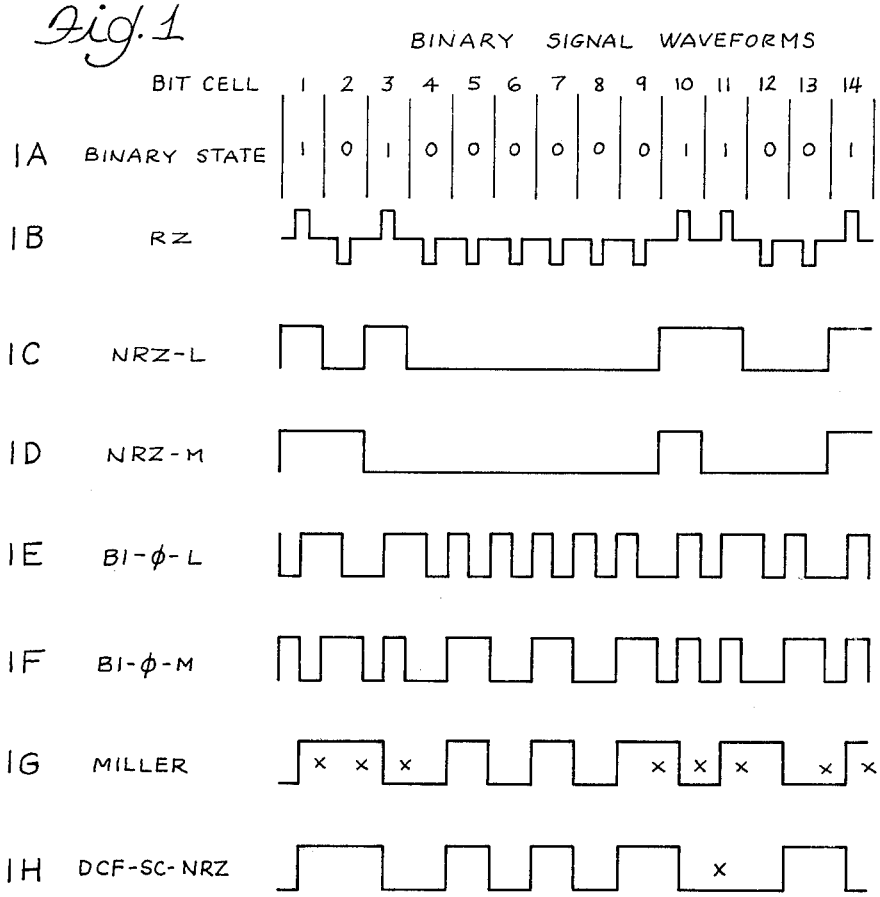
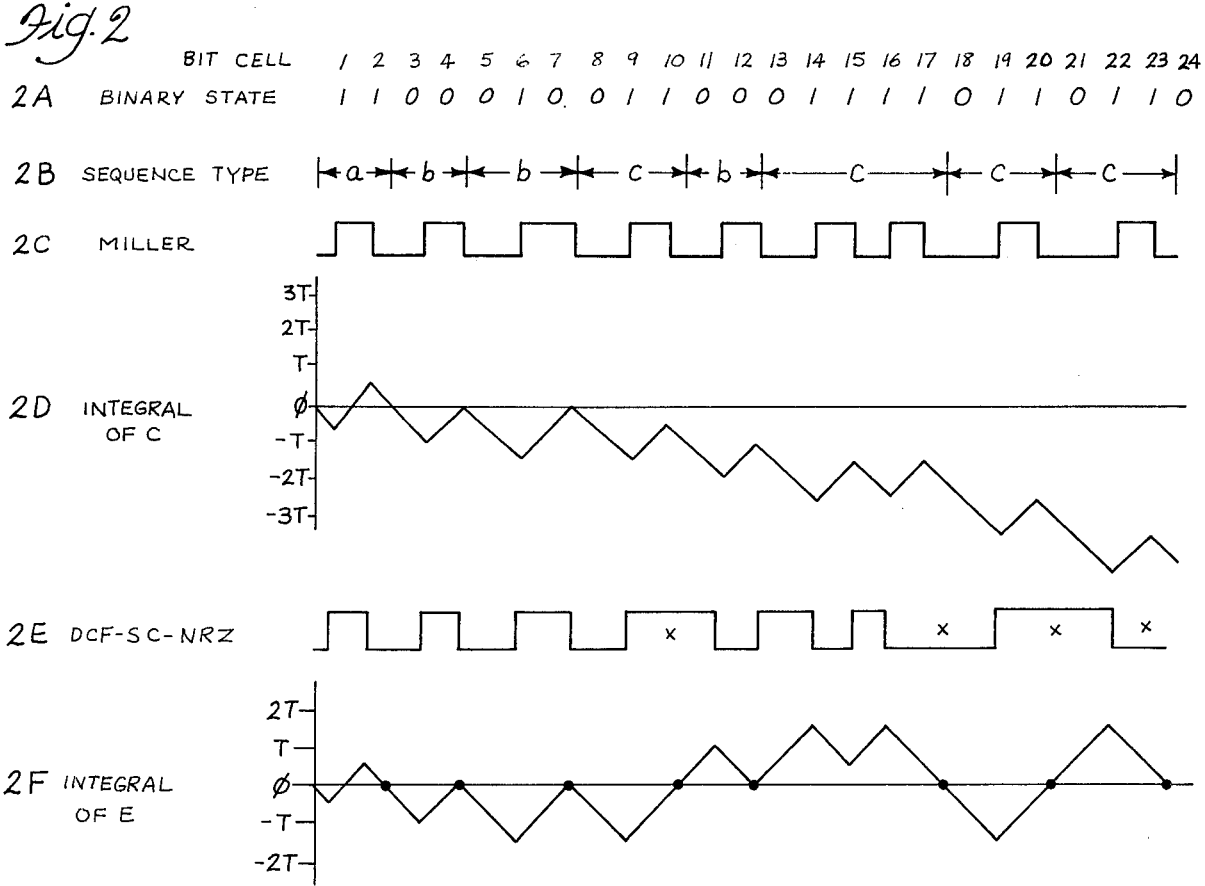

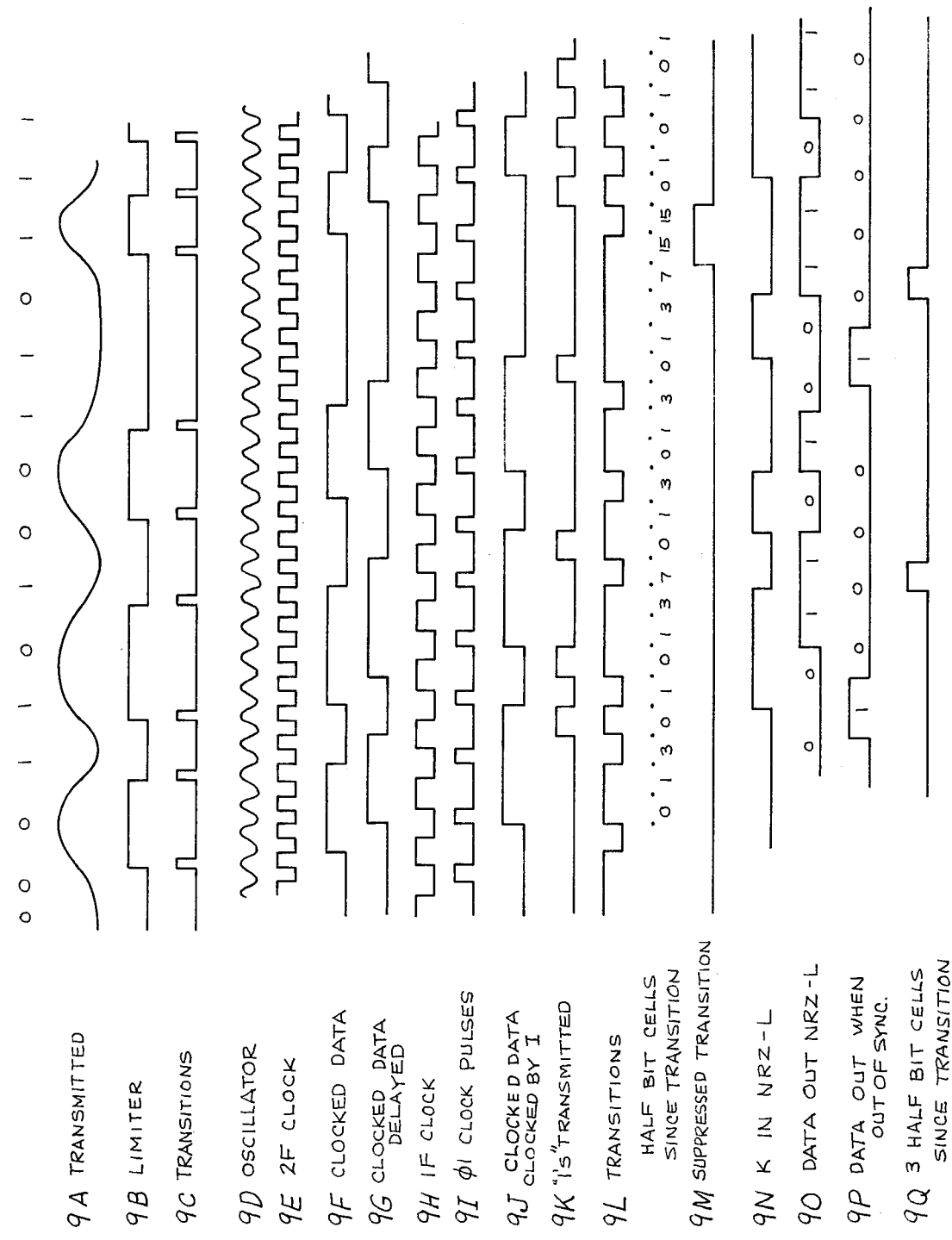

DC FREE ENCODING FOR DATA TRANSMISSION SYSTEM

This invention relates to the transmission of data in binary form serially through an information channel. More particularly it relates to a method and system for transmitting signals that are self-clocking and still more particularly to such method and system for transmission through an information channel having no response at zero frequency. The invention relates to the encoding and decoding of particular binary codes. The invention finds particular application where the information channel comprises a magnetic tape recorder.

Data or information in binary form is comprised of data bits wherein the information in each bit is in the form of one or the other of two states. Such states are often referred to as logical 1 and logical 0. In operating with information in binary form it is necessary to recognize the respective logic states for each bit. Whether these bits are recorded on tape or are otherwise recorded or transmitted, each bit of information may be said to be maintained in a bit cell which represents an interval in time or space containing the responsive bit of information. The logic states may be recognized or referred to variously as "yes" or "no", "+" or "−", "up" or "down", and "true" or "not true", and the like. Where the information is recorded on a tape recorder, the states may be of opposite magnetic polarization. It is also common to have one state a reference level and the other state a different level, in which case indication of the second state may be provided by a recognizable signal while the first state is indicated by absence of such signal. There is positive logic and negative logic. Further it makes no difference for the purposes of this invention which of the two states is called 1 and which is called 0.

As noted, the present invention finds particular applicability to information channels such as magnetic recording channels which have no response at zero frequency; that is, they do not transmit at DC. In general it is desirable to record data bits as closely together as possible while producing errors so infrequently as to be tolerable. Various recording formats or binary data codes have been developed for recording binary data. Some codes desirably permit self-clocking; that is, the bit cell intervals may be identified in the recorded bit data without the need for separate timing pulses.

In information channels which do not transmit DC, binary wave forms suffer distortions of peak amplitude value and zero-crossing location which cannot be removed by means of linear response compensation networks unless the channel affords substantial response at frequencies at least as great as the bit rate. These distortions are commonly described as baseline wander and act to reduce the effective signal-to-noise ratio and thus degrade the reliability of detection of the recorded signals.

A common transmission format or data code is that utilized in the recording and reproducing system disclosed in Miller U.S. Pat. No. 3,108,261, issued Oct. 22, 1963 for Recording and/or Reproducing System. In the Miller code, logical 1's are represented by signal transitions at a particular location in the respective bit cells, specifically at mid-cell, and logical 0's are represented by signal transitions at a particular earlier location in the respective cells, specifically at the beginning or leading edge of each bit cell. The Miller format involves the suppression of any transition occurring at the beginning of one bit interval following an interval containing a transition at its center. The asymmetry of the waveform generated by these rules introduces DC into the information channel.

A code based upon the Miller code but with the DC component eliminated is described by A. M. Patel in "Zero-Modulation Encoding in Magnetic Recording", IBM J. Res. Develop., Vol. 19 No. 4, July, 1975. This format, commonly called ZM, is based upon the Miller format for most input sequences but sequences of the form 0111 - - - 110 having an even number of 1's are coded by special rules. While this code eliminates the DC content in the encoded waveform, it does so at the expense of requiring that each sequence to be specially coded be recognized in advance of coding any part of the sequence. This requirement for look-ahead sequence scanning implies a coding delay (and coder memory) nearly as long as the longest possible sequence of the indicated type. To avoid requiring "infinite" memory, the Patel system provides for dividing input sequences periodically by inserting additional suitably chosen parity bits. This practically requires a rate change to accommodate the inserted bits. Further the bits necessarily occupy some of the space available for recording.

In accordance with the present invention a binary input data stream of rate 1/T bits per second is encoded into a binary wave-form having a minimum interval between transitions of T seconds, a maximum between transitions of 3 T seconds, no DC content, and a maximum value for the running integral of the waveform of 1.5 T seconds times half the magnitude of a transition. The encoding procedure requires no rate change and entails an encoding delay of only 2T seconds. Decoding requires inspection of no more than 2 successive bit intervals; hence errors cannot propagate beyond this bound. The format utilized in the present invention achieves the high frequency response requirements of the Miller code with the DC-free characteristic of the ZM code without the rate change and added redundancy of the latter and without requiring long memory.

The format of the present invention may be characterized as a DC-free, self-clocking, non-return-to-zero format or DCF-SC-NRZ. Thus a primary object of the present invention is to provide a system and method for transmitting binary data serially over an information channel incapable of transmitting DC, although of course the method and system can be used with information channels having DC capability. It is a further object of the invention to provide such method and system where the data is transmitted in self-clocking form. It is still another object of the invention to provide such system and method without the need for rate change or large memory.

Other objects and advantages of the invention will become clear from the following detailed description, particularly when taken in conjunction with the appended drawings in which:

FIG. 1, consisting of FIGS. 1A through 1H, illustrates a number of binary signal waveforms including those following the format according to the present invention and various formats of the prior art;

FIG. 2, consisting of FIGS. 2A through 2F shows comparative waveforms utilizing the Miller format and a format according to the present invention together with comparisons of the integrals of the transmitted signals;

Figure 3:
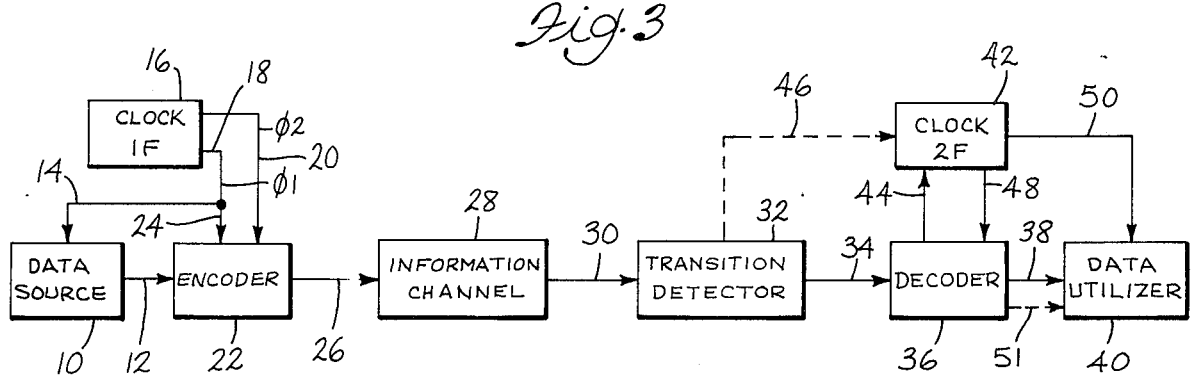
FIG. 3 is a block diagram of the system of the present invention.
Figure 4:
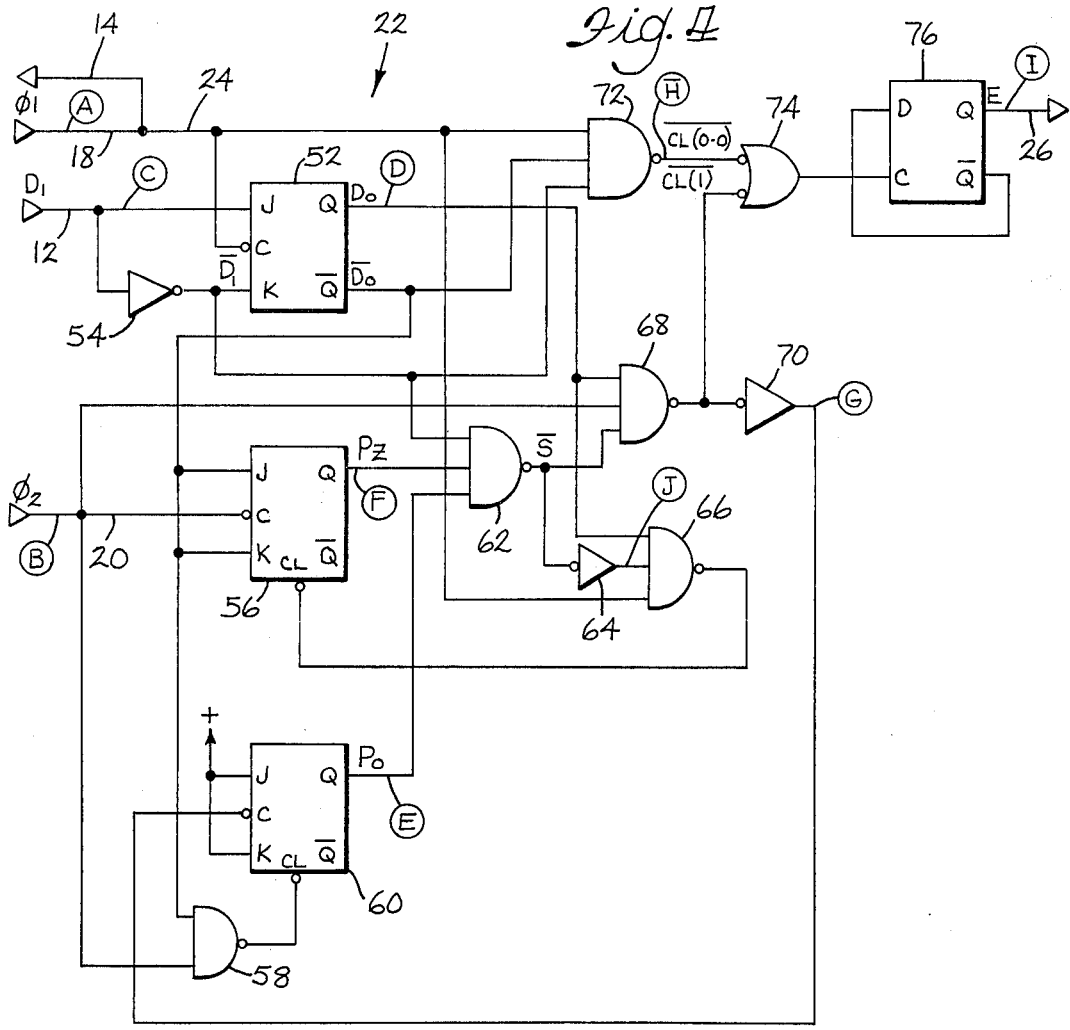
FIG. 4 is a schematic diagram of one form of encoder useful in the system shown in FIG. 3.
Figure 5:
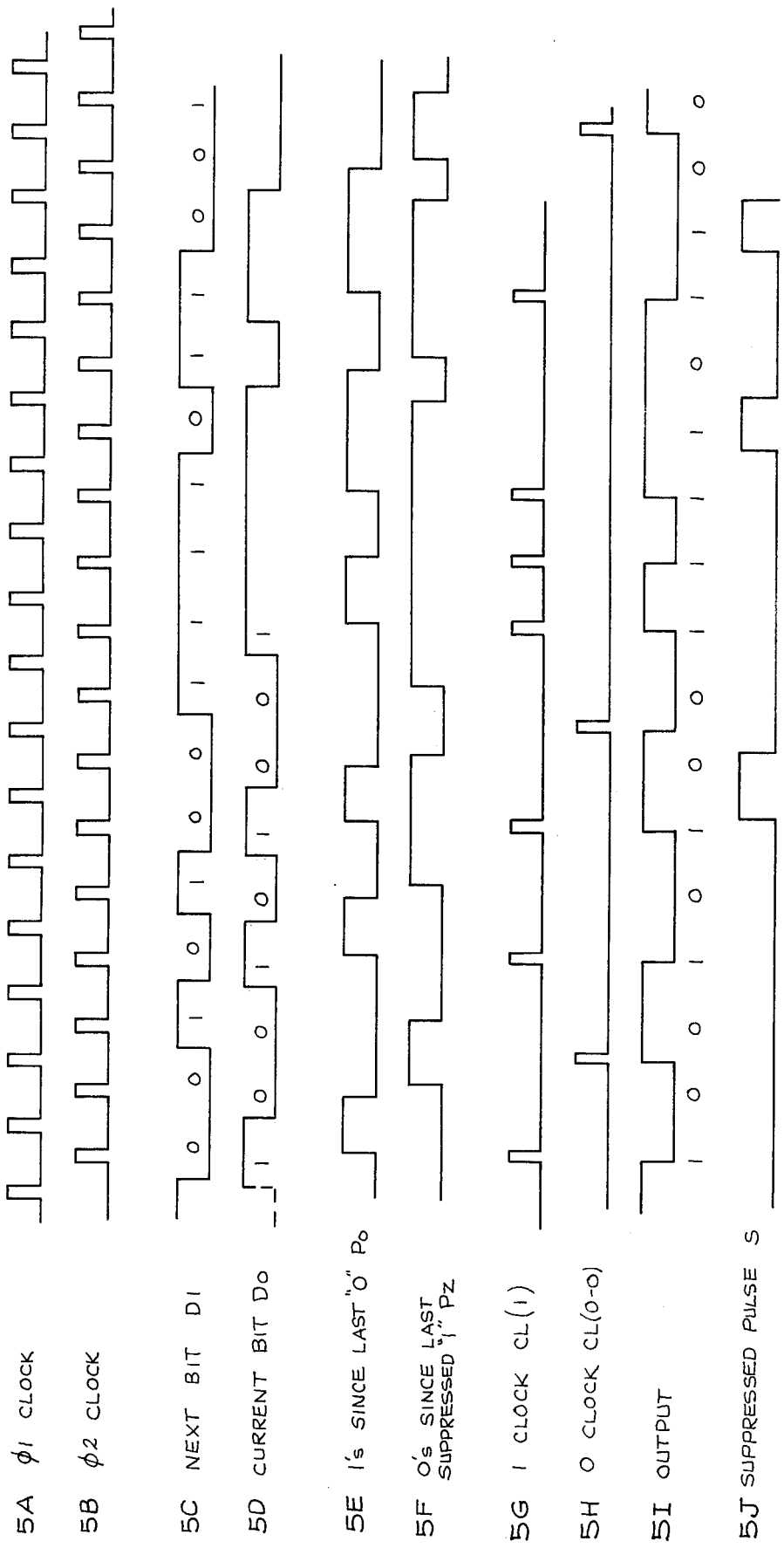
Figure 6:
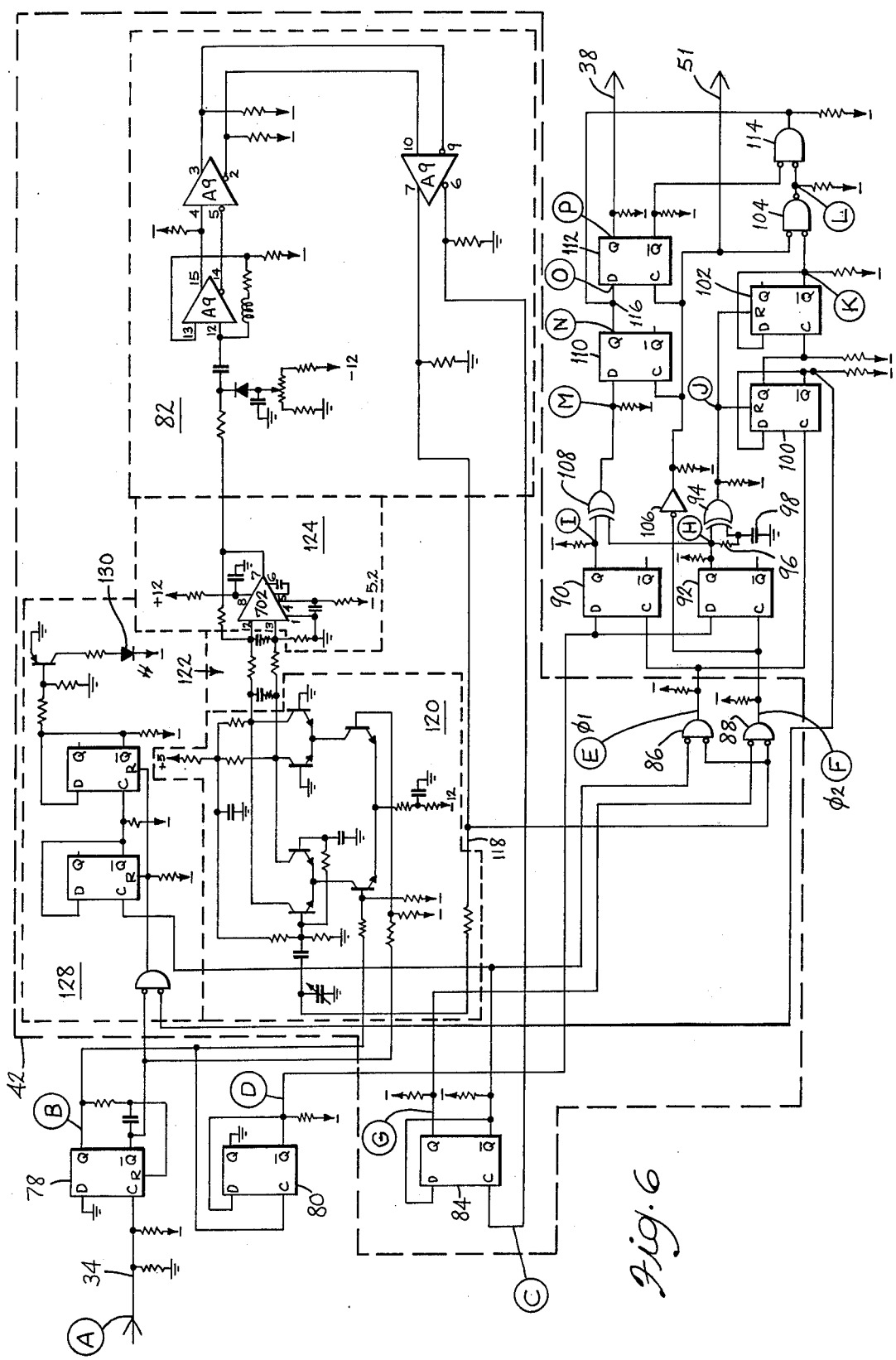
Figure 7:
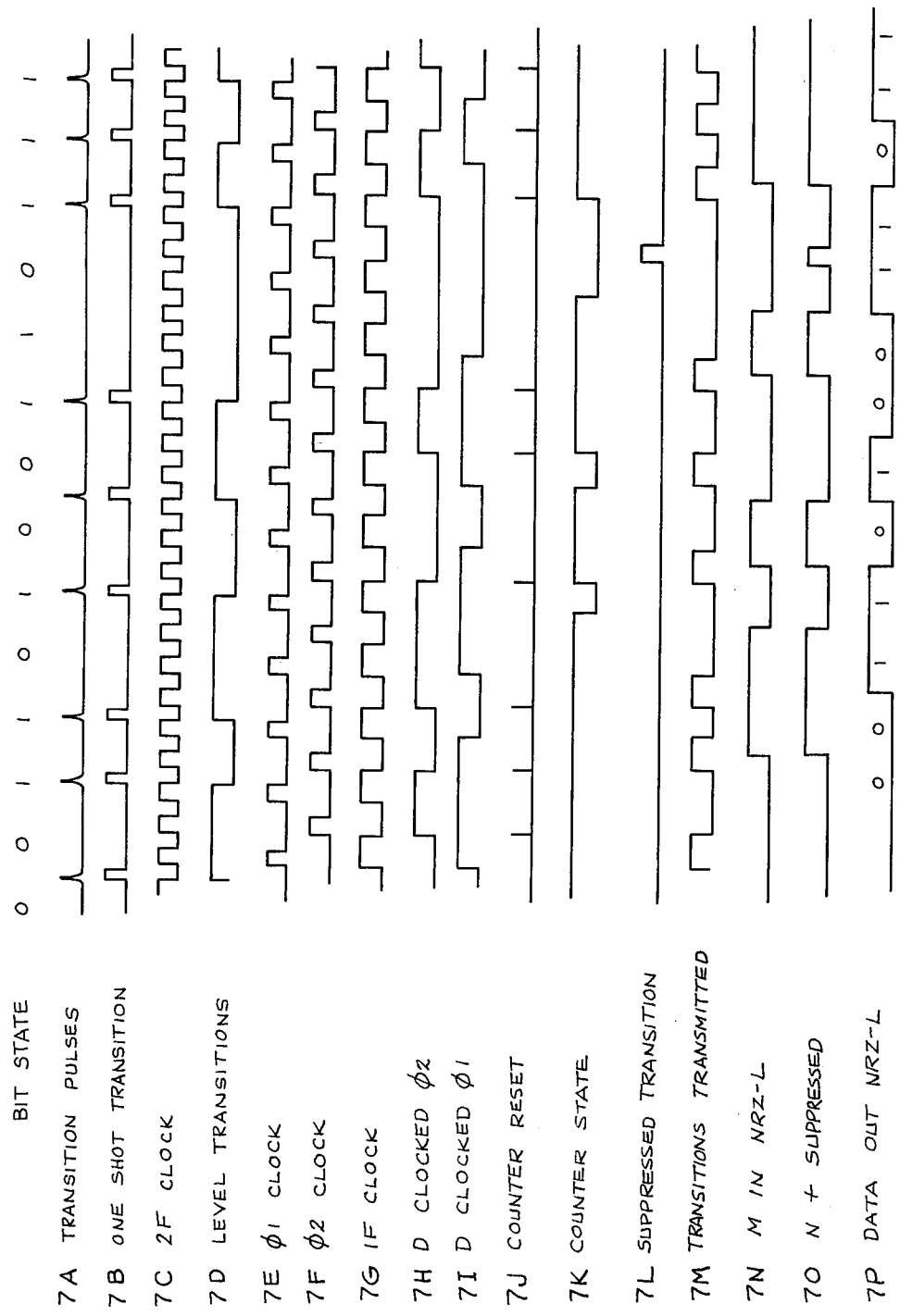
Figure 8:
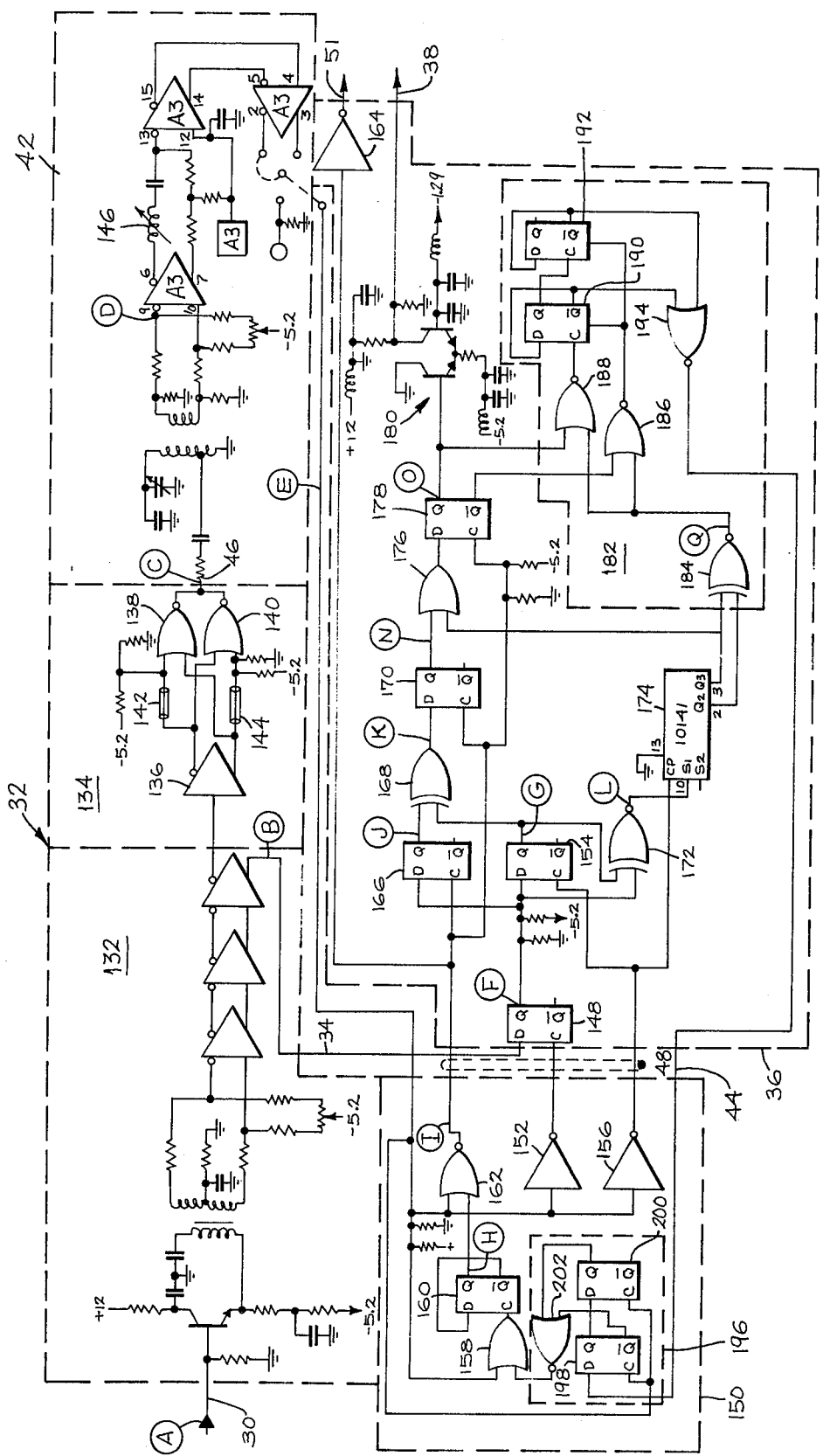

FIG. 5, consisting of FIGS. 5A through 5J, is a timing diagram illustrating the operation of the encoder of FIG. 4;

FIG. 6 illustrates one form of decoder and one form of 2F clock useful in the system illustrated in FIG. 3;

FIG. 7, consisting of FIGS. 7A through 7P, is a timing diagram illustrating the operation of the circuit of FIG. 6;

FIG. 8 is a schematic illustration of another form of decoder and clock useful in the system illustrated in FIG. 3 together with a transition detector useful in the circuit illustrated in FIG. 3; and FIG. 9, consisting of FIGS. 9A through 9Q, is a timing diagram illustrating the operation of the circuit of FIG. 8.

For an understanding of the present invention and its advantages, it will be helpful to consider various binary data formats utilized previously. In FIG. 1 there are illustrated a number of binary signal waveforms useful in transmitting or recording information serially in binary form. Waveform 1H utilizes the format of one form of the present invention. The waveforms of FIG. 1 are divided into bit cells with each cell containing a bit of data in binary form; that is, in each cell the binary information is in either state 1 or state 0. By way of example, FIG. 1A indicates the binary state of the information in a number of successive bit cells. This same information is contained in various forms in the respective waveforms.

Waveform 1B follows a return-to-zero (RZ) format wherein 1's are indicated by upward or positive levels and 0's are indicated by down or negative levels, with the signal returning to a central or zero level between cells.

A more commonly used format is the non-return-to-zero (NRZ) data code illustrated by waveforms 1C and 1D. Waveform 1C, NRZ-L, corresponds to the waveform 1B, RZ, without the return to zero between bit cells. In this code, the signal remains at a 1 level or state for the entire cell containing a 1 bit and goes to the 0 level or state where there is a 0 state in the bit cell. Thus, there are transitions only when successive bit cells are in different states. In the waveform illustrated in FIG. 1D, NRZ-M, the code is a non-return-to-zero-mark code wherein each logic 1 is indicated by a transition between the two levels while a logical 0 is indicated by the absence of such transition. The difficulty with both of the NRZ codes is the very large possibility of timing errors as the signal may remain in one state or the other for relatively long periods. It is therefore helpful to use self-clocking codes.

Waveforms 1E and 1F are so-called Manchester codes, also known as bi-phase-level (BI-L) and bi-phase-mark (BI-M), respectively. In the bi-phase-level code of FIG. 1E, the state of the bit is indicated by the direction of the transition in the middle of a bit cell. As shown in FIG. 1E, a transition upward at mid-cell indicates a logical 1 and a transition downward at mid-cell indicates a logical 0. In the bi-phase-mark code of FIG. 1F, a logical 1 is shown by a transition, either upward or downward, at mid-cell while a logical 0 is indicated by absence of any transition at mid-cell. Self-clocking of the bi-phase-level signal is achieved by utilization of the mid-cell transitions in each bit cell. Self-clocking of the bi-phase mark signal is achieved by introducing a transition at the beginning of each bit cell. While the Manchester codes do not require a DC transmission capability, the addition of so many additional transitions materially increases the required bandwidth.

A waveform following the format utilized in Miller U.S. Pat. No. 3,108,261 is illustrated in FIG. 1G. As in the biphase-mark code, logical 1's are indicated by transitions in midcell and logical 0's are indicated by the absence of such transitions. In the Miller format, however, there are no timing transitions at the beginning of bit cells containing logical 1's and transitions are suppresssed where they would otherwise occur at the beginning of respective bit cells following the respective mid-cell transition. In the basic Miller code this means that there is a transition at mid-cell for each logical 1 and at the beginning of each cell for each logical 0 except for the case when a logical 0 follows a logical 1. The suppressed transitions are indicated by X's on the waveform 1G. While the Miller code requires only the smaller bandwidth of the NRZ code and provides the self-clocking feature of the Manchester codes, it is not entirely free of DC. Certain sequences of logical 1's and 0's may unbalance the waveform following the Miller code. For example, in the illustrated waveform 1G, the suppression of the transition between cells 11 and 12 may add a DC component that is not subsequently offset by suppression of an oppositely directed transition. If similar sequences are repeated, the DC component will grow, as will be described in greater detail below in respect to FIG. 2.

One format in accordance with the present invention is illustrated in FIG. 1H, DCF-SC-NRZ. The present invention eliminates the DC component by suppressing another, but oppositely directed, transition. In accordance with the present invention it is a transition that can be subsequently identified as having been suppressed by reason of the particular rules defining the format. More particularly in accordance with a specific form of the invention, the next preceding transition is suppressed as indicated by an X on the waveform 1H, this being the mid-cell transition in bit cell 11.

As understanding of how the DC problem arises from use of the Miller code and how the problem is overcome by the use of the present invention will be facilitated by reference to FIG. 2. In the Miller code, the bits are identified by the phase of transition in level. With one exception, the 0 bits are identified by transitions in a relatively early part of a bit cell whereas 1 bits are identified by transitions relatively late in the bit cell. More specifically, in the illustrated waveforms, 0 bits are identified by transitions at the beginning of the cell, and 1 bits are identified by transitions at midcell. The one exception is that transitions are suppressed that would occur within one bit cell of any prior transition. The effect of this is to suppress transitions identifying a 0 bit following a 1 bit.

Referring to FIG. 2, FIG. 2A indicates by way of example the binary state of successive bit cells in a data stream. Waveform 2C is a waveform of a signal identifying the bits of such data stream in accordance with the Miller format. FIG. 2D represents the integral of the area under the waveform of FIG. 2C relative to the level of the midpoint of a transition. The transitions go one unit above and one unit below this mid-level. The length of each bit cell is time T. It may be noted that the integral returns to zero after each cycle of the Miller signal through bit cell 7. Thereafter, the integral remains negative, subsequently becoming more and more negative. This introduces the DC component previously mentioned, leading to errors where there is no DC transmission capability in the information channel, as in magnetic recording.

Reflection on waveform 2C for the particular example of a data stream will reveal why this is so. For each bit cell containing a 1 bit the signal is balanced above and below the mid-level, making no net change in the integral. When the levels for successive 0 bits are in opposite directions again the signal is balanced, making no net change in the integral. When successive 0 bits are separated by an odd number of 1 bits, the signal levels in the respective 0 bit cells are in opposite directions, and again the signal is balanced. A problem arises only where 0 bits are separated by an even number of 1 bits. In that case, the signal levels in the 0 bit cells are in the same direction, resulting in a net accumulated area under the curve and a net displacement of the integral from zero. Each time there is a sequence of data in which two 0 bits are spaced by an even number of 1 bits, there is a net displacement of the integral. Of course, the displacement can be in either direction, and some of the time the displacement will return the integral toward zero. However, it is also possible that the areas accumulate, as shown in the example FIG. 2D.

The problem is obviously created by the suppression of the transition at the beginning of a 0 state following a succession of an even number of 1 states, making the signal asymmetrical. The solution to the problem, in accordance with the present invention is to suppress still another transition. In one format according to the present invention, it is the next preceding transition that is suppressed, the result being that illustrated by waveform 2E, where the additional supressed transitions are indicated by an X. As is evident from the integral of this waveform as shown in FIG. 2F, there is then no net DC component. Of course, this is possible only if the suppressed transitions can be identified by a decoder. Otherwise, the information is lost. The present invention includes a method and system for identifying these suppressed transitions.

For an understanding of how such identification is achieved, the input data stream may be viewed as the concatenation of variable length sequences of three types: (a) sequences of the form 1111 - - - 111, any number of 1's but no 0's; (b) sequences of the form 0111 - - - 1110, an odd number of consecutive 1's or no 1's, with 0's in the first and last positions; (c) sequences of the form 0111 - - - 111, any even number of consecutive 1's preceded by a 0. A sequence is to type (c) only if the first bit of the next following sequence is a zero.

As explained above, if the Miller code is applied to these three sequence types, the integral of the resulting waveform for sequence types (a) and (b) always reaches zero at the end of the sequence. It is only the integral of the waveform for sequence type (c) that does not. Rather it reaches a value of $\pm T$, the sign depending on the sense of the last transition preceding the sequence. Further, if a sequence of type (c) is followed, either immediately or after certain combinations of other sequence types, by another sequence of type (c), the integral of the concatenation of sequences will grow. For some choices of concatenated sequences, the running integral grows without bound and this is the situation which yields DC content in the waveform, as illustrated by waveform 2D.

Each increment in the running integral may be said to originate in a type (c) sequence, since no other sequence type makes any net contribution to the integral. According to the present invention, sequences of types (a) and (b) are encoded according to the Miller code. A sequence of type (c) is encoded according to Miller code rules for all bits except the last 1, and for this 1 the transition is simply suppressed. By this means, the type (c) sequence, viewed in isolation, is made to appear the same as a type (b) sequence, that is, the final 1 looks like a 0, and the sequence integral is brought to zero. In the example of FIG. 2, the respective types of sequences are identified in FIG. 2B.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, then a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded are 1 and 0 in that order, then no transitions are output during the next two bit intervals. If the next subsequent bit is another 0, then it is separated from its predecessor by a transition in the usual Miller code fashion.

The method and system of the present invention thus provides for the transmission of data in binary form over an information channel incapable of transmitting DC, the information being transmitted in self-clocking fashion.

As mentioned earlier, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

In FIG. 3 there is illustrated generally in block diagram form a system for encoding a data stream in serial binary bit form in accordance with the format described above, transmitting this information over an information channel, and decoding the received signals for subsequent utilization. A data source 10 provides data in binary form serially to a path 12 when clocked by clock pulses applied over a path 14 from a clock 16. The data in the data source 10 can arise from any number of origins. However they arise, the data are converted by well known means into binary form and arranged to be clocked out serially as by the clock pulses on the path 14.

The clock 16 produces clock pulses periodically at a frequency 1F. The clock may comprise any of a number of well known oscillators. The clock pulses produced should have a fast rise time. Inasmuch as the transitions for signifying logical 1's and logical 0's occur at mid-cell and edge cell or more generally at a later phase and an earlier phase, the clock 16 provides clock pulses in two phases. Phase 1 ($\phi$1) clock pulses are applied to a path 18 and are thence applied over the path 14 to clock the data source 10. Phase 2 ($\phi 2$) clock pulses appear on a path 20.

An encoder 22 receives the data in serial form from the data source 10 over the path 12 and also receives $\phi 1$ clock pulses from the path 18 over a path 24 and $\phi 2$ clock pulses over the path 20. The encoder 22 operates upon the data as received in accordance with the format of the present invention, as described above, DCF-SC-NRZ. The encoded data are applied over a path 26 to an information channel 28 which may comprise a magnetic tape recorder where the information is recorded and later read out. The output of the information channel appears on a path 30. Transitions in the signal are noted by a transition detector 32 which produces signals on a path 34 indicative of the transitions.

A decoder 36 receives these transition signals and decodes the information back to its original or a related form and provides the decoded information over a path 38 to a data utilization circuit 40. As mentioned earlier, the signal format of the present invention provides for self-clocking. That is, the decoder 36 must be time oriented to correspond with the original $\phi 1$ and $\phi 2$ signals to be able to recognize when in each bit cell the transition occurred. This synchronization is achieved by utilization of a clock 42 which provides clock pulses at twice the frequency of the clock 16 or at a frequency 2F. To synchronize the clock, signals from the decoder may be applied over a path 44 or signals may be applied over a path 46 from the transition detector 32. In either event, appropriate timing signals are applied over a path 48 to the decoder. Timing signals are also applied to the data utilization circuit 40; they may be applied from the clock 42 over a path 50 or indirectly through the decoder over a path 51. It may be noted that a path may comprise a plurality of conductors.

While a number of other circuits could be used, a preferred encoder 22 is illustrated in FIG. 4, with a timing diagram for that circuit being shown in FIG. 5. The inputs to the circuit are the phase 1 ($\phi 1$) and phase 2 ($\phi 2$) clock pulses applied over paths 24 and 20, respectively, and the data input $D_1$ applied over path 12. The clock pulses are illustrated by waveforms 5A and 5B. (The points where the respective waveforms appear in the circuit are identified by corresponding circled letters on the drawings.) As illustrated by waveform 5A, the $\phi 1$ clock pulses are uniform pulses occurring periodically with a period equal to one bit cell length and having fast rise and fall times and having a pulse length substantially less than one-half bit cell. The $\phi 2$ clock pulses illustrated by waveform 5B are identical to the $\phi 1$ clock pulses except delayed one-half bit cell. Thus, the $\phi 1$ clock pulses rise at the beginning of each bit cell and the $\phi 2$ clock pulses rise at the midpoint of each bit cell. The input data is applied in the form NRZ-L as the next bit $D_1$ (waveform 5C). The data input ($D_1$) for a particular bit cell is applied to the J terminal of a JK flip-flop 52. At the same time the data input is inverted by an inverter 54 and applied to the K terminal of the flip-flop 52. The $\phi 1$ clock pulses are applied to the clock terminal of the JK flip-flop 52, whereby each negative-going transition of the $\phi 1$ clock pulses as shown in waveform 5A causes the signals on the J and K terminals to be transferred to the Q and $\overline{Q}$ terminals, respectively. Thus, the signals currently appearing on the Q and $\overline{Q}$ terminals may be considered signals $D_O$ and $\overline{D}_O$, the signal and the inverted signal from the previous bit cell. The signal $D_O$ is shown as the current bit in waveform 5D. The waveforms are shown with up as 1 and its inverse or down as 0. The $\overline{D}_O$ signal is applied to terminals J and K of a JK flip-flop 56 with the $\phi 2$ clock pulses being applied to the clock terminal of the JK flip-flop 56. Thus, with each clock pulse the JK flip-flop 56 changes state when $D_O$ is 0 and remains in the same state with each clock pulse when $D_O$ is 1. In other words, the flip-flop 56 counts zero bit states, modolo-2, the output $P_z$ being 0 when there is an even number of zero bit counted and 1 when there is an odd number of zero bits counted, the output appearing on terminal Q of the flip-flop 56. The flip-flop 56 is reset by a reset pulse applied to its clear terminal upon occurrence of a suppressed 1. The development of this reset pulse will be described further below.

The $\overline{D}_O$ signal and the $\phi 2$ clock pulses are also applied to a NAND gate 58, the output of which clears a JK flip-flop 60 whenever $D_O$ is 0 at the time of the clock pulse. The J and K terminals of the JK flip-flop 60 are connected to a positive reference, whereby each clock pulse applied to the clock terminal of the flip-flop 60 causes the output $P_O$ at terminal Q to count the number of phases applied to its clock input terminal, modulo-2, since the last 0 cleared the flip-flop. The signals applied to the clock terminal are CL(1) illustrated as waveform 5G and are developed as explained further below. The JK flip-flop 60 thus counts whether the number of ones since the last 0 is odd or even, $P_O$ being 0 when the count is even, and $P_O$ being 1 when the count is odd.

As described above, the desired encoding is to provide a mid-cell transition for each 1 bit, except for a sequence of type (c) which is a 0 followed by an even number of 1's. The flip-flops 56 and 60 determine whether or not it is a sequence of type (c). Since any number of sequences of type (a) and type (b) include an even number of zeros, signal $P_z$ will be 1 for any sequence of type (c). At the same time, the count of the flip-flop 60 will be odd, or $P_O$ will equal 1, for a sequence of type (c) just before the time for the transition to be suppressed.

The determination of whether or not a transition is to be suppressed is made by a NAND gate 62. That is, when $P_O$ and $P_z$ are both 1 and $D_1$ is 1 at the same time, indicating that signal $D_1$ is 0, the NAND gate 62 senses that the sequence then ending is of type (c) and its output $\overline{S}$ goes low. The signal $\overline{S}$ is inverted by an inverter 64 to form a signal S, the waveform for which is illustrated by wave-form 5J. A NAND gate 66 responds to signals S and $D_O$ and the $\phi 1$ clock pulses. Thus, when the NAND gate 62 indicates that a bit is to be suppressed and $D_O$ is 1, indicating that there would otherwise be a transition, the NAND gate 66 provides a reset pulse for the JK flip-flop 56 upon the occurrence of the next $\phi 1$ clock pulse. The $D_O$ input to the NAND gate 66 prevents a reset pulse when $D_O$ is 0 as would otherwise occur in a sequence of two 0's.

The mid-cell transitions for 1 bits are developed by a NAND gate 68 to which three signals are applied, the $D_O$ signals, the $\phi 2$ clock signals, and the $\overline{S}$ inverted suppression signals. The output of the NAND gate 68 is thus the inverse of the signal shown by waveform 5G, CL(1); the outut of the NAND gate 68 goes negative for the duration of a $\phi 2$ clock pulse occuring at mid-cell whenever $D_O$ is 1, except when the NAND gate 62 has determined that the transition there should be suppressed. The output of the NAND gate 68 is inverted by an inverter 70 to provide the clock pulses for the JK flip-flop 60 described above.

Transitions at the beginning of bit cells containing logical 0's are developed by a NAND gate 72 to which three signals are applied. The $\phi 1$ clock pulses, the $\overline{D}_0$ signals, and the $\overline{D}_1$ signals. The inverse of the output of the NAND gate 72 is shown by waveform 5H. The output of the NAND gate 72 is 0 for the duration of the $\phi 1$ clock pulses at the beginning of each bit cell only when both $D_0$ and $D_1$ are 0. Thus, the signal as shown in waveform 5H, CL(0-0) comprises positive pulses at the beginning of bit cells containing logical 0's that are preceded by bit cells containing logical 0's. The NAND gate 72 thus acts to suppress transitions at the beginning of bit cells containing logical 0's that are preceded by logical 1's. In accordance with the normal Miller code, the signals from the NAND gates 68 and 72 are applied to a NAND gate 74 which combines the signals marking mid-cell transitions for bit cells containing logical 1's and signals marking edge cell transitions for bit cells containing logical 0's with appropriate transitions suppressed in accordance with the present invention.

The output of the NAND gate 74 is applied to the clock terminal C of a D flip-flop 76 having its $\overline{Q}$ output connected to its D input, whereby each transition signal at the terminal C produces a change of state or transition in accordance with waveform 5I on the path 26.

The special tasks of the encoder may be summarized as follows. (1) First, it must recognize the beginning of each sequence which may be of type (c). This is done in the encoder of FIG. 4 by means of the flip-flop 56 which toggles each time a 0 is encoded and which is cleared each time a transition is inhibited at the end of a type (c) sequence. Obviously, this flip-flop toggles twice during a type (b) sequence and never changes state during a type (a) sequence, and therefore is in its cleared state before the start of any sequence if it is cleared before encoding begins. Next, it must recognize the end of a type (c) sequence. This is done in the encoder of FIG. 4 by means of the flip-flop 60 which toggles each time a 1 is encoded and which is cleared each time a 0 is encoded. Then if the flip-flop 60 is in its set state, the present bit to be encoded is a 1, the next following bit is a 0, and the 0 counting flip-flop 56 is in its set state, the time is right to suppress a transition. Thus, this part of the encoder requires a 1 bit look-ahead, but no more than that. Differently stated, a 1 bit delay is incurred in this part of the encoder. All other encoding follows the prescriptions of Miller U.S. Pat. No. 3,108,261.

As indicated in FIG. 3, the encoded information on the path 26 passes through an information channel 28 and then over a path 30 to a transition detector 32. The transition detector may take various forms. One form of transition detector will be described below in connection with FIG. 8. The output of the transition detector is applied over the path 34 to the decoder 36.

A preferred form of the decoder 36 and a preferred form of the 2F clock 42 are shown in FIG. 6. Timing diagrams for the circuit of FIG. 6 are shown by the waveforms in FIG. 7. The transition detector, such as detector 32 shown by FIG. 8, provides pulses on the input path 34 in the form illustrated by waveform 7A where a sharp pulse marks each transition. The transition pulses are applied to the clock input of a D flip-flop 78 connected as a one shot multivibrator, which thereupon produces pulses of waveform 7B on the Q output of the D flip-flop 78. The duration of each output pulse is determined by the time constant of the integrating resistor and capacitor connected between the Q and $\overline{Q}$ terminals of the D flip-flop 78. The duration of the pulses are made short relative to one-half bit cell.

The signals of waveform 7B are applied to the clock input of a D flip-flop 80 connected as shown to change state with each clock pulse, thereby producing at output terminal $\overline{Q}$ a waveform as shown by waveform 7D, changing state with each transition detected by the transition detector 32.

Clock pulses are developed by the clock 42 which, in the circuit illustrated, includes a voltage controlled oscillator 82 producing pulses at twice bit frequency, as shown by waveform 7C. In the circuit illustrated, the integrated circuit indicated as A9 comprises an integrated circuit of Motorola type MC10116 Triple Line Receiver, connected as shown in FIG. 6. The timing of these clock pulses by the transmitted signals will be explained in greater detail below. The clock pulses at double frequency 2F are applied to the clock terminal of a D flip-flop 84, connected to provide a transition at each clock pulse on its clock terminal. The output at terminal Q of the D flip-flop 84 is thus, as shown by waveform 7G, a square wave a bit frequency. The $\overline{Q}$ output is the same square wave, but of opposite phase.

The Q output of the D flip-flop 84 is applied to a NOR gate 86, the other input to the NOR gate being the inverse of the signal of waveform 7C. The output of the NOR gate 86 is thus in the form illustrated by waveform 7E, forming $\phi 1$ clock pulses at bit cell rate at the cell boundary. Similarly, the $\overline{Q}$ output of the D flip-flop 84 is applied to a NOR gate 88 to which signals of phase opposite to that of waveform 7C are also applied, thus producing the $\phi 2$ clock pulses, as shown by waveform 7F, at bit frequency in mid-cell.

The detected transmitted signal, waveform 7D, is applied to the D input terminals of D flip-flops 90 and 92. The D flip-flop 92 is clocked by $\phi 2$ clock pulses, waveform 7F, and thus produces a change in output at terminal Q upon the occurrence of each clock pulse following a transition in the data signal, waveform 7D. This produces a signal of the form, as shown by waveform 7H, in which there is a transition at mid-cell in the event of a data signal transition at the beginning or middle of that respective cell.

Similarly, the D flip-flop 90 is clocked by the $\phi 1$ clock pulses, waveform 7E, and its output, as shown by waveform 7I, changes state with the first $\phi 1$ clock pulse occurring after a transition in the signal level. Hence, waveform 7I shows a transition at the beginning of a bit cell in the event of a transition at mid-cell of the previous bit cell or at the beginning of the current cell.

The Q output of the D flip-flop 92, waveform 7H, is applied to an exclusive OR gate 94 connected as a transition detector. That is, a resistor 96 and a capacitor 98 are connected to delay the application of the Q output of the D flip-flop 92 to the other input of the exclusive OR gate 94, whereby any transition in the Q output of the D flip-flop 92 causes the two inputs of the exclusive OR gate 94 to differ momentarily until the delayed signal appears at the other input, making both inputs the same. The resultant pulses are as shown by waveform 7J.

The pulses of waveform 7J are used to reset D flip-flops 100 and 102 which comprise a four-state counter, counting $\phi 1$ pulses applied to the C input of the D flip-flop 100. The four-state counter thus counts $\phi 1$ clock pulses occurring after any bit cell in which there was a transition in the transmitted signal. The $\overline{Q}$ output of the D flip-flop 102 thus goes to 0 at the beginning of the second bit cell following a cell in which there was a transition. From the manner in which the information was encoded in the first place, it is evident that where the four-state counter is not reset by the signal of waveform 7J by the middle of the second bit cell following a bit cell in which there was a transition, a transition had been suppressed from the transmitted signal. Thus, the state of the four-state counter as shown by waveform 7K identifies suppressed transitions. The signal shown by waveform 7K is applied to one input of an OR gate 104, the $\phi 2$ clock pulses are inverted by an inverter 106 and applied to the other input terminal of the gate 104. This develops a pulse at mid-cell in the second cell following the last previous cell in which there was a transition. This signal indicates the transition suppressed from the transmitted signal.

As noted above, the D flip-flops 90 and 92 identify transitions occurring subsequent to the last previous respective clock pulse. The respective Q outputs are applied to a exclusive OR gate 108 which thus produces a 1 output whenever the outputs of the respective D flip-flops 90 and 92 differ. A difference will occur upon each transition in the transmitted data stream at a time determined by which flip-flop first recognizes the transition. Thus, mid-cell transitions are first recognized by the flip-flop 92, and cell edge transitions are first recognized by the flip-flop 90. The output of the exclusive OR gate 108, as shown by waveform 7M, thus comprises pulses corresponding to the transition pulses of waveform 7A.

The signals of the waveform 7M are applied to the D input of a D flip-flop 110 which is clocked by inverted $\phi 2$ clock pulses. This produces a 1 at the Q terminal of the D flip-flop 110 for any bit cell in which there is a transition at mid-cell and 0 for any other cell.

The reinsertion of the suppressed pulse is achieved by operation of a D flip-flop 112 and a NOR gate 114 to produce the reconstituted signal in NRZ-L form as waveform 7P. The reconstituted signal then traverses the path 38 to the data utilization circuit 40. The inverted output of the D flip-flop 112 is applied to one input terminal of the NOR gate 114, and the signal indicating suppressed pulses, waveform 7L, is applied to the other terminal of the NOR gate 114. This thus produces a 1 whenever a suppressed pulse occurs in a bit cell following a bit cell containing a 1 bit. This signal is combined with the signal from the D flip-flop 110 at a junction 116, as shown by waveform 7O. The D flip-flop 112 is clocked by inverted $\phi 2$ clock pulses producing the reconstituted data in NRZ-L form on the path 38. Inverted $\phi 2$ clock pulses are developed on the path 51 for utilization by the data utilizer 40.

Returning now to the matter of timing the voltage controlled oscillator 82 of the clock circuit 42, the output of the voltage controlled oscillator 82 is applied over a conductor 118 to a phase comparator 120 which compares the phase of the oscillator 82 with the phase of the output of the D flip-flop 78, producing an output through a filter 122 dependent upon the magnitude and direction in which the signals are out of phase. The out-of-balance signal is applied to a differential amplifier 124 which in the embodiment illustrated comprises a Fairchild Linear Op Amp 702 connected as indicated. The differential amplifier 124 develops a control voltage which is applied to the voltage controlled oscillator 82 to control its period in such manner as to bring the oscillator output into proper phase in respect to the transitions signified by the output of the D flip-flop 78. An indicator 128 indicates by means of an LED 130 when the clock 42 is not properly synchronized with the received transitions. The clock 42 may then be returned to synchronism in a number of ways, as by suppressing a clock pulse.

An alternative decoder 36 and an alternative clock 42 are illustrated in FIG. 8 with the timing diagram for the circuit of FIG. 8 being shown in FIG. 9. In addition, the circuit of FIG. 8 includes a transition detector 32. The received signal is of the form illustrated by waveform 9A. This signal is applied on path 30 at terminal A of the transition detector 32. The transition detector 32 comprises a limiter circuit 132 and a differentiating circuit 134. The limiter circuit 132 greatly amplifies the input signal and cuts the peaks off to produce a corresponding data output signal on line 34 having sharp transitions at the zero crossings of the input signal, as shown by waveform 9B. The inverted output signal from the limiter 132 is applied to the differentiating circuit 134, which develops signals of opposite phase in an amplifier 136. The two outputs of the amplifier 136 are applied to both of NOR gates 138 and 140 with the inverted signal being delayed slightly by a delay line 142 in its application to the NOR gate 138 and the not-inverted signal being delayed slightly by a delay line 144 in its application to the NOR gate 140. The differentiating circuit 134 thus provides at line 46 a signal of the waveform shown by waveform 9C, with a pulse for each transition in the input signal waveform 9A.

The clock 42 in this embodiment comprises a ringing oscillator producing a signal of the form of waveform 9D at point D, which, after amplifying and limiting becomes a square wave at point E as shown by waveform 9E. The integrated circuit A3 comprising the clock 42 in the embodiment illustrated comprises a Motorola Triple Line Receiver MC10216 connected as indicated, with pins 1 and 16 grounded and pin 8 at −5.2v. The phase of the pulses on line 46, relative to the oscillations in the tank circuit of the oscillator, advance or retard the oscillations to synchronize the output at point E with the transitions in the input information. The phase of the clock output at point E may be adjusted by a variable inductance 146 to place the clock pulses as shown in waveform 9E in appropriate relationship to the data transitions as shown by waveform 9B.

The data signals of waveform 9B are applied to the decoder 36 over the path 34 to the D input of a D flip-flop 148. The clock pulses of waveform 9E are applied through a clock output circuit 150 to the C input terminal of the D flip-flop 148, the clock signals being inverted by an inverter 152 in the clock output circuit 150. This clocks the data from the D terminal to the Q output terminal of the D flip-flop 148, producing a signal as shown by waveform 9F, which corresponds to the input data of waveform 9A. The signal on the Q output terminal of the D flip-flop 148 is applied to the D input terminal of a D flip-flop 154. The clock pulses of waveform 9E are inverted by an inverter 156 and applied to the C terminal of the D flip-flop 154. The D flip-flop 154 thus receives the output of the D flip-flop 148 and reproduces that output with a delay of one 2F clock pulse, that is, one-half bit cell displacement. The pulses of waveform 9E also operate through an OR gate 158 to toggle a D flip-flop 160 to produce an output on its Q terminal as shown by waveform 9H. These are clock pulses of frequency 1F or bit cell rate. These pulses are applied to a NOR gate 162 gated by the 2F clock pulses of waveform 9E to produce what might be called $\phi 1$ clock pulses occurring at the beginning of each bit cell, as shown in waveform 9I. These $\phi 1$ clock pulses, inverted by an inverter 164, become the output clock pulses on path 51.

The clocked data of waveform 9F are applied to the D input terminal of a D flip-flop 166 which is clocked by the $\phi 1$ clock pulses of waveform 9I, producing on the Q output terminal a signal as indicated by waveform 9J, which provides a transition upon each $\phi 1$ clock pulse when there has been a transition in the clocked data of waveform 9F since the previous $\phi 1$ clock pulse.

The signals of waveform 9G are compared with the signals of waveform 9J in an exclusive OR gate 168. Whenever the two signals differ, as will occur when there are mid-cell transitions in the transmitted data signifying 1's, the output of the exclusive OR gate 168 goes high as illustrated by waveform 9K. The output of the exclusive OR gate 168 is applied to the D input of a D flip-flop 170 which is also clocked by the $\phi 1$ clock pulses of waveform 9I to produce at its Q output terminal a waveform as shown by waveform 9N which is essentially the transmitted 1's in NRZ-L format.

The data input and output of the D flip-flop 154 are applied to an exclusive NOR gate 172 which hence detects any transitions in the input data occurring since a previous 2F clock pulse on the clock terminal of the D flip-flop 154. A 0 output of the exclusive NOR gate 172 thus indicates a data transition, as shown by waveform 9L.

Suppressed data transitions are detected by a four-bit shift register 174. In the embodiment illustrated, the shift register 174 comprises a Motorola MC10141 4-Bit Left/Right Shift Register connected as shown in FIG. 8. The shift register 174 is reset upon each data transition by the signal from the exclusive NOR gate 172. The shift register 174 is clocked by the 2F clock pulses inverted by the inverter 156. The shift register clocks in a 1 with each clock pulse and advances the 1 along the four output terminals one after the other. The output states are thus successively 0000, 0001, 0011, 0111 and 1111. In a decimal system, their states may be said to be 0, 1, 3, 7 and 15. Subsequent clock pulses leave the output at 1111. For the example given in FIG. 9, the state of the shift register is indicated between waveforms 9L and 9M. As the shift register is clocked by 2F clock pulses, the shift register advances each half bit cell. In the normal Miller code, the longest interval without transitions occurs from a sequence 101 which leaves an interval of two full bit cells without a transition; that is, from a mid-cell 1 transition through an entire 0 bit cell to the next mid-cell 1 transition. In the format described above for the present invention, where a 1 bit is suppressed, the time between transitions is longer when a 1 bit transition is suppressed. Thus, the suppression of a 1 bit transition may be recognized by the failure of a transition to occur in less than two and one-half bit cells of a previous transition. This state is indicated by the state of the shift register 174 which advances with each 2F clock pulse after a transition through the cycle 0, 1, 3, 7, 15, remaining in state 15 until reset. Thus, when the shift register 174 reaches its fifth state, state 15, there have been five half-bit cells or two and one-half bit cells subsequent to the previous transition. This indicates the suppression of a 1 bit. State 15 is indicated by the presence of a 1 on the fourth output terminal, which is pin 3 of a Motorola MC10141 shift register. For the particular example of FIG. 9, the signal on that terminal is as shown by waveform 9M which indicates a suppressed transition. This signal is combined with the transmitted 1 signal indicated by waveform 9N in an OR gate 176, the combined signal being applied to the D terminal of a D flip-flop 178 which is clocked by the $\phi 1$ clock pulses of waveform 9I. This returns a suppressed transition to the fold and produces the reconstituted data in NRZ-L form on the Q output terminal of the D flip-flop 178 as shown by waveform 9O. The reconstituted signal is applied through a buffer amplifier 180 to the output path 38.

The above description of the circuit of FIG. 8 has assumed the clock 42 to be in proper synchronism with the input transition. However, because the clock 42 has a basic frequency twice the bit cell frequency, it is possible for the clock to be in phase with the mid-cell transitions rather than with edge cell transitions. In that case, the data out at terminal Q of D flip-flop 178 would appear as shown by waveform 9P. The lack of synchronization may be detected by a synchronization detector 182 which recognizes certain impermissible output conditions. In the format described in connection with FIG. 9 and FIG. 8, any transition following a 0 edge cell transition must occur either two half-bit cells later (for a succeeding 0 bit transition) or three half-bit cells later (for a mid-cell 1 bit transition). Thus, when the system is properly synchronized, the bit state counter 174 is always reset by the third half-bit cell following a 0 bit transition. On the other hand, following a 1 bit transition, the bit state counter may count further, as for example, in a sequence 10101, where the 0 bit transition is omitted following a mid-cell 1 bit transition, there will be four half-bit cells between transitions. Thus, when the shift register 174 has been clocked three times following reset, the last transition which reset the shift register 174 must have been a 1 bit if the device is in synchronization. The shift register 174 is in this state when the third output terminal is at 1 and the fourth output terminal is at 0, the third output terminal being pin 2 of the shift register MC10141. The condition of three half-bit cells following reset is sensed by an exclusive NOR gate 184 which provides a waveform as shown by waveform 9Q. The signal of waveform 9Q is applied to NOR gates 186 and 188. Depending upon whether the data output on the Q terminal of the D flip-flop 178 is 1 or 0, the signal of waveform 9Q either clears D flip-flops 190 and 192 through the gate 186 or clocks the D flip-flop 190 through the gate 188. Two clockings of the D flip-flop 190 clocks the flip-flop 192. The $\overline{Q}$ outputs of the D flip-flops 190 and 192 are applied to a NOR gate 194 which produces on the path 44 a signal indicative of a lack of synchronization when the count of the D flip-flops 190 and 192 reaches 3. The signal on the path 44 is applied to a pulse suppression circuit 196 in the clock output circuit 150. The circuit 196 comprises a pair of D flip-flops 198 and 200 and a NOR gate 202. The flip-flops 198 and 200 are clocked by the 2F clock pulses of waveform 9E to produce at the output of the NOR gate 202 a signal to the OR gate 158 to suppress the clock pulse to the D flip-flop 160, thus dropping one-half cycle from the output of the D flip-flop 160, placing the circuit in proper synchronization.

To assure proper synchronization it is desirable to start transmission with a lead-in series of pulses of characteristic transitions providing an easily recognizable signal if the system is out of synchronization. Such a series is 10101. This avoids losing data before the data themselves provided a series of transitions that reveals the error in synchronization.

It may be noted that a similar synchronization circuit could be utilized with the decoder of FIG. 6.

While one specific encoding circuit has been shown and two different decoding circuits operating on the same code have been disclosed, it should be evident that other particular circuitry may be used for the same purposes. Further, other code formats may be used coming within the scope of the present invention. Broadly, the invention encompasses a method and system wherein a data stream in binary serial form is considered as the concatenation of a plurality of types of sequences of 1's, some of which may create a DC imbalance if the code format of Miller U.S. Pat. No. 3,108,261 were used. In accordance with the present invention, means are provided for indicating at the outset of any sequence of 1's whether or not the sequence is of the sort that could introduce DC imbalance. Means looking no more than one bit state ahead then notes the end of a particular sequence of 1's and indicates whether or not the particular sequence of 1's was of the sort that would introduce a DC component into the transmission signal with normal transmission. Means responsive to this last indication then provides remedial action at the end of the sequence appropriate for eliminating any DC component. Any modification of the signals is performed in a manner that may be recognized by corresponding decoding apparatus.

What is claim is:

1. In a self-clocking transmission system for transmitting binary data sequentially in successive clocked bit cells of a transmission channel wherein logical first bit states are normally transmitted as signal transitions relatively early in the respective bit cells and logical second bit states are normally transmitted as signal transitions relatively late in respective bit cells and any transitions relatively early in a bit cell following a transition relatively late in the next preceding bit cell is suppressed, apparatus for modifying the transmitted signal to remove any net DC component, said apparatus comprising first indicating means responsive to bit states for producing at the onset of a sequence of second bit states following a first bit state a first indicating signal indicating any such sequence that might introduce a DC component into the transmitted signal with normal transmission, and means responsive to said first indicating signal, a current bit and but one next succeeding bit for modifying the transmission of signal transitions to eliminate any DC components.

2. In a self-clocking transmission system for transmitting binary data sequentially in successive clocked bit cells of a transmission channel wherein logical first bit states are normally transmitted as signal transitions relatively early in the respective bit cells and logical second bit states are normally transmitted as signal transitions relatively late in the respective bit cells and any transition relatively early in a bit cell following a transition relatively late in the next preceding bit cell is suppressed, apparatus for modifying the transmitted signal to remove any net DC component, said apparatus comprising first indicating means responsive to bit states for producing at the onset of a sequence of second bit states following a first bit state a first indicating signal indicating any such sequence that might introduce a DC component into the transmitted signal with normal transmission, second indicating means responsive to said first signal and to but one bit next succeeding a current bit for producing a second indicating signal indicating the end of a sequence of second bit states that would introduce a DC component into the transmitted signal with normal transmission, and means responsive to said second indicating signal for modifying the transmission of signal transitions at the end of such a sequence to eliminate any DC component.

3. Apparatus in accordance with claim 2 wherein said means for modifying the transmission of signal transitions suppresses the transition corresponding to the last second bit state in such a sequence that would introduce a DC component into the transmitted signals with normal transmission.

4. Apparatus in accordance with claim 3 further including decoding means responsive to transmitted signal transitions for indicating the bit states of the binary data transmitted, said decoding means comprising synchronizing means responsive to transmitted signal transitions for providing timing signals for distinguishing relatively early transitions from relatively late transitions, detection means responsive to said transmitted signal transitions and said timing signals for indicating first bit states upon receipt of relatively early transitions and second bit states upon receipt of relatively late transitions, suppressed transition detection means responsive to said transmitted signal transitions and said timing signal for detecting the absence of a transition within 2½ bit cells following a relatively late transition by producing a suppressed transition detection signal, and means responsive to said suppressed transition detection signal for indicating the bit following that corresponding to the transition preceding said 2½ bit cells as in the second bit state, and means responsive to said timing signals for indicating any other bits as in the first bit state.

5. Apparatus in accordance with claim 2 wherein said first indicating means responds to first bit states following a suppressed second bit state transition to produce such a first indicating signal when the number of such first bit states following a suppressed second bit state transition is odd, said second indicating means being enabled by such a first indicating signal to respond to second bit states following an odd number of first bit states to produce such a second indicating signal when the number of second bit states at the end of the sequence of second bit states is even, and said means responsive to said second indicating signals is enabled by such a second indicating signal to suppress any signal transition in the transmitted signal corresponding to the last second bit state in a respective sequence of second bit states.

6. Apparatus in accordance with claim 2 further including decoding means responsive to transmitted signal transitions for indicating the bit state of the binary data transmitted, said decoding means comprising synchronizing means responsive to transmitted signal transitions for providing timing signals for distinguishing relatively early transitions from relatively late transitions, first detection means responsive to said transmitted signal transitions and said timing signals for indicating first bit states upon receipt of relatively early transitions and second bit states upon receipt of relatively late transitions, second detection means responsive to said transmitted signal transitions and said timing signals for detecting the modification of normal transmission by producing a modification signal and means responsive to said modification signal for reconstituting the original data, and means responsive to said timing signals for indicating any other bit as in the first bit state.

7. In a self-clocking transmission system for transmitting binary data sequentially in successive clock bit cells of a transmission channel wherein logical first bit states are normally transmitted as signal transitions relatively early in respective bit cells, logical second bit states are normally transmitted at signal transitions relatively late in the respective bit cells, any transition corresponding to a first bit state following a second bit state is suppressed, and certain transitions corresponding to second bit states preceding the first bit states are suppressed, decoding apparatus responsive to transmitted signal transitions for indicating the bit state of the binary data transmitted, said decoding apparatus comprising synchronizing means responsive to transmitted signal transitions for providing timing signals for distinguishing relatively early transitions from relatively late transitions, detection means responsive to said transmitted signal transitions and said timing signals for indicating first bit states upon receipt of relatively early transitions and second bit states upon receipt of relatively late transitions, suppressed transition detection means responsive to said transmitted signal transitions and said timing signals for detecting the absence of a transition within 2½ bit cells following a relatively late transition by producing a suppressed transition detection signal, and means responsive to said suppressed transition detection signal for indicating the bit following that corresponding to the transition preceding said 2½ bit cells as in the second bit state, and means responsive to said timing signals for indicating any other bit as in the first bit state.

8. A self-clocking method for transmitting binary data sequentially in successive clock bit cells of a transmission channel wherein logical first bit states are normally transmitted by signal transitions relatively early in respective bit cells and logical second bit states are normally transmitted as signal transitions relatively late in respective bit cells and any transition relatively early in a bit cell following a transition relatively late in the next preceding bit cell is suppressed, detecting the onset of a sequence of second bit states following a first bit state that might introduce a DC component to the transmitted signal with normal transmission by producing a first indicating signal indicating any such sequence, and in response to said first indicating signal and the state of a current bit and the state of the next succeeding bit modifying the transmission of signal transitions to eliminate any DC component.

9. A self-clocking method for transmitting binary data sequentially in successive clock bit cells of a transmission channel wherein logical first bit states are normally transmitted as signal transitions relatively early in the respective bit cells and logical second bit states are normally transmitted as signal transitions relatively late in the respective bit cells and any transition relatively early in a bit cell following a transition relatively late in the next preceding bit cell is suppressed, detecting the onset of a sequence of second bit states following a first bit state that might introduce a DC component into the transmitted signal with normal transmission by producing a first indicating signal indicating any such sequence, and in response to said first indicating signal and to the state of the next succeeding bit detecting the end of a sequence of second bit states that would introduce a DC component into the transmitted signal with normal transmission by producing a second indicating signal indicating any such sequence that would introduce a DC component, and in response to said second indicating signal modifying the transmission of signal transitions at the end of such a sequence to eliminate any DC component.

10. A method according to claim 9 wherein the transmission of signals transitions is modified by suppressing the transition corresponding to the last second bit state in such a sequence that would introduce a DC component in normal transmission.

11. A method in accordance with claim 10 wherein the transmitted signal is decoded by deriving a timing signal from the transmitted data signal transitions for distinguishing relatively early and relatively late transitions, indicating first bit states upon relatively early transitions and second bit states upon relatively late transitions, detecting a suppressed relatively late transition by the absence of a transition within 2 and a fraction bit cells subsequent to a relatively late transition, and indicating a second bit state upon the detection of a suppressed relatively late transition, and indicating a first bit state in the absence of a transition in any other respective bit cell.

12. A method in accordance with claim 9 wherein such a first indicating signal is produced when the number of such first bit states following a suppressed second bit state transition is odd, such a second indicating signal is produced when the number of second bit states at the end of the sequence of second bit states is even, and the transmission of signal transitions is modified by suppressing any signal transition signal corresponding to the last second bit state in a respective sequence of second bit states when the first indicating signal indicates an odd number of first bit states and the second indicating signal indicates an even number of second bit states.

13. A method in accordance with claim 9 wherein the transmitted signal is decoded by deriving a timing signal from the transmitted data signal transitions for distinguishing relatively early and relatively late transitions, indicating first bit states upon relatively early transitions and second bit states upon relatively late transitions, detecting modification of normal transmission, and indicating a second bit state upon the detection of such modification, and indicating a first bit state in the absence of a transition in any other respective bit cell.

14. In a self-clocking method for transmitting binary data sequentially in successive clock bit cells of a transmission channel wherein logical first bit states are normally transmitted as signal transitions relatively early in respective bit cells, logical second bit states are normally transmitted as signal transitions relatively late in respective bit cells, any transitions corresponding to a first bit state following a second bit state is suppressed, and certain transitions corresponding to second bit states preceding first bit states are suppressed, a method of decoding the transmitted signal comprising deriving a timing signal from the transmitted data signal transitions for distinguishing relatively early and relatively late transitions, indicating first bit states upon relatively early transitions and second bit states upon relatively late transitions, detecting a suppressed relatively late transition by the absence of a transition within 2 and a fraction bit cells subsequent to a relatively late transition, and indicating a second bit state upon the detection of a suppressed relatively late transition, and indicating a first bit state in the absence of a transition in any other respective bit cell.

* * * * *

UNITED STATES PATENT OFFICE
CERTIFICATE OF CORRECTION

PATENT NO. : 4,027,335                        Page 1 of 3
DATED : May 31, 1977
INVENTOR(S) : Jerry W. Miller It is certified that error appears in the above–identified patent and that said Letters Patent are hereby corrected as shown below:

Column 8, line 27, change "$P_0$" to -- $P_o$ -- ;

line 28, change "O" to -- 0 -- ;

change "$P_0$" to -- $P_o$ -- ;

line 38, change "$P_0$" to -- $P_o$ -- ;

line 43, change "$P_0$" to -- $P_o$ -- ;

change "$D_1$" to -- $\bar{D}_1$ -- ;

line 44, change "O" to -- 0 -- ;

line 48, change "wave-form" to -- waveform -- ;

line 55, change "O" to -- 0 -- ;

line 62, change "outut" to -- output -- ;

Column 10, line 24, change "a", second occurrence, to -- at -- ;

Column 11, line 22, change "a" to -- an -- ;

line 50, change "70" to -- 70 -- ; and,

Column 14, line 14, change "90" to -- 90 -- .

UNITED STATES PATENT OFFICE
CERTIFICATE OF CORRECTION

PATENT NO. : 4,027,335

DATED : May 31, 1977

INVENTOR(S) : Jerry W. Miller

It is certified that error appears in the above-identified patent and that said Letters Patent are hereby corrected as shown below:

In the Abstract:

line 7, after "1's" insert a comma -- (,) -- .

In the Specification:

Column 4, line 43, change "As" to -- An -- ;

Column 5, line 35, change "supressed" to -- suppressed -- ;

line 48, change "an" to -- any -- ;

line 51, change "to" to -- of -- ;

Column 7, line 32, after "applied" add -- directly -- ;

line 66, change "$D_0$", second occurrence, to -- $\overline{D}_0$ -- ;

Column 8, line 5, change "O" to -- 0 -- ;

line 8, change "bit" to -- bits -- ;

line 17, change "O" to -- 0 -- ;

line 21, change "$P_0$" to -- $P_O$ -- ;

line 23, change "O" to -- 0 -- ;

UNITED STATES PATENT OFFICE
CERTIFICATE OF CORRECTION

PATENT NO. : 4,027,335
DATED : May 31, 1977
INVENTOR(S) : Jerry W. Miller

It is certified that error appears in the above-identified patent and that said Letters Patent are hereby corrected as shown below:

In the Claims:

Column 16, line 40, change "bits" to -- bit -- .

In the Specification:

Column 8, line 7, change "modolo" to --modulo--;

line 63, change "occuring" to --occurring--; and

Column 14, line 54, change "clocks" to --clock--.

Signed and Sealed this

Thirty-first Day of October 1978

[SEAL]

Attest:

RUTH C. MASON
*Attesting Officer*

DONALD W. BANNER
*Commissioner of Patents and Trademarks*